US009888097B2

(12) United States Patent
Lambeth et al.

(10) Patent No.: US 9,888,097 B2
(45) Date of Patent: *Feb. 6, 2018

(54) PRIVATE ALLOCATED NETWORKS OVER SHARED COMMUNICATIONS INFRASTRUCTURE

(71) Applicant: Nicira, Inc., Palo Alto, CA (US)

(72) Inventors: W. Andrew Lambeth, San Mateo, CA (US); Anupam Dalal, Mountain View, CA (US); Borislav Deianov, Mountain View, CA (US); Jun Xiao, Beijing (CN)

(73) Assignee: NICIRA, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/063,379

(22) Filed: Mar. 7, 2016

(65) Prior Publication Data
US 2016/0261725 A1    Sep. 8, 2016

Related U.S. Application Data

(63) Continuation of application No. 14/059,413, filed on Oct. 21, 2013, now Pat. No. 9,306,910, which is a
(Continued)

(51) Int. Cl.
*H04L 29/06* (2006.01)
*H04L 12/715* (2013.01)
(Continued)

(52) U.S. Cl.
CPC .......... *H04L 69/22* (2013.01); *H04L 12/4633* (2013.01); *H04L 12/4641* (2013.01);
(Continued)

(58) Field of Classification Search
CPC ... H04L 69/22; H04L 65/4076; H04L 69/324; H04L 12/4633; H04L 12/4641;
(Continued)

(56) References Cited

U.S. PATENT DOCUMENTS

| 5,504,921 A | 4/1996 | Dev et al. |
| 5,550,816 A | 8/1996 | Harwick et al. |

(Continued)

FOREIGN PATENT DOCUMENTS

| JP | 2004-145684 | 5/2004 |
| WO | WO 03/58584 | 7/2003 |
| WO | WO 2008/098147 | 8/2008 |

OTHER PUBLICATIONS

Author Unknown, "Cisco VN-Link: Virtualization-Aware Networking," Month Unknown, 2009, 10 pages, Cisco Systems, Inc.
(Continued)

*Primary Examiner* — Brian O'Connor
(74) *Attorney, Agent, or Firm* — Adeli LLP

(57) ABSTRACT

Methods and systems for implementing private allocated networks in a virtual infrastructure are presented. One method operation creates virtual switches in one or more hosts in the virtual infrastructure. Each port in the virtual switches is associated with a private allocated network (PAN) from a group of possible PANs. In one embodiment, one or more PANs share the same physical media for data transmission. The intranet traffic within each PAN is not visible to nodes that are not connected to the each PAN. In another operation, the method defines addressing mode tables for the intranet traffic within each PAN. The entries in the addressing mode tables define addressing functions for routing the intranet traffic between the virtual switches, and different types of addressing functions are supported by the virtual switches.

20 Claims, 12 Drawing Sheets

Related U.S. Application Data continuation of application No. 12/571,224, filed on Sep. 30, 2009, now Pat. No. 8,619,771.

(51) Int. Cl.
*H04L 12/741* (2013.01)
*H04L 12/46* (2006.01)
*H04L 29/12* (2006.01)
*H04L 29/08* (2006.01)
*H04L 12/931* (2013.01)

(52) U.S. Cl.
CPC ............ *H04L 45/04* (2013.01); *H04L 45/745* (2013.01); *H04L 49/70* (2013.01); *H04L 61/6022* (2013.01); *H04L 63/0272* (2013.01); *H04L 65/4076* (2013.01); *H04L 69/324* (2013.01); *H04L 69/325* (2013.01); *H04L 49/354* (2013.01)

(58) Field of Classification Search
CPC ............... H04L 69/325; H04L 61/6022; H04L 63/0272; H04L 45/745; H04L 49/70; H04L 45/04; H04L 49/354
See application file for complete search history.

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 6,104,699 A | 8/2000 | Holender et al. |
| 6,111,876 A | 8/2000 | Franz et al. |
| 6,151,324 A | 11/2000 | Belser et al. |
| 6,219,699 B1 | 4/2001 | McCloghrie et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,765,921 B1 | 7/2004 | Stacey et al. |
| 6,785,843 B1 | 8/2004 | McRae et al. |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,120,728 B2 | 10/2006 | Krakirian et al. |
| 7,146,431 B2 | 12/2006 | Hipp et al. |
| 7,197,572 B2 | 3/2007 | Matters et al. |
| 7,200,144 B2 | 4/2007 | Terrell et al. |
| 7,203,944 B1 | 4/2007 | van Rietschote et al. |
| 7,209,439 B2 | 4/2007 | Rawlins et al. |
| 7,260,648 B2 | 8/2007 | Tingley et al. |
| 7,263,700 B1 | 8/2007 | Bacon et al. |
| 7,277,453 B2 * | 10/2007 | Chin ................. H04L 29/12066 370/392 |
| 7,283,473 B2 | 10/2007 | Arndt et al. |
| 7,339,929 B2 | 3/2008 | Zelig et al. |
| 7,342,916 B2 | 3/2008 | Das et al. |
| 7,366,182 B2 * | 4/2008 | O'Neill ............... H04L 12/4641 370/395.53 |
| 7,391,771 B2 | 6/2008 | Orava et al. |
| 7,450,498 B2 | 11/2008 | Golia et al. |
| 7,450,598 B2 | 11/2008 | Chen et al. |
| 7,463,579 B2 | 12/2008 | Lapuh et al. |
| 7,467,198 B2 | 12/2008 | Goodman et al. |
| 7,478,173 B1 | 1/2009 | Delco |
| 7,483,370 B1 | 1/2009 | Dayal et al. |
| 7,512,744 B2 | 3/2009 | Banga et al. |
| 7,554,995 B2 | 6/2009 | Short et al. |
| 7,555,002 B2 | 6/2009 | Arndt et al. |
| 7,577,722 B1 | 8/2009 | Khandekar et al. |
| 7,606,260 B2 | 10/2009 | Oguchi et al. |
| 7,640,298 B2 | 12/2009 | Berg |
| 7,643,488 B2 | 1/2010 | Khana et al. |
| 7,649,851 B2 | 1/2010 | Takashige et al. |
| 7,660,324 B2 | 2/2010 | Oguchi et al. |
| 7,710,874 B2 | 5/2010 | Balakrishnan et al. |
| 7,716,667 B2 | 5/2010 | van Rietschote et al. |
| 7,725,559 B2 | 5/2010 | Landis et al. |
| 7,752,635 B2 | 7/2010 | Lewites |
| 7,761,259 B1 | 7/2010 | Seymour |
| 7,764,599 B2 | 7/2010 | Doi et al. |
| 7,792,987 B1 | 9/2010 | Vohra et al. |
| 7,797,507 B2 | 9/2010 | Tago |
| 7,801,128 B2 | 9/2010 | Hoole et al. |
| 7,802,000 B1 | 9/2010 | Huang et al. |
| 7,814,228 B2 | 10/2010 | Caronni et al. |
| 7,814,541 B1 | 10/2010 | Manvi |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,840,701 B2 * | 11/2010 | Hsu ......................... H04L 29/06 370/401 |
| 7,853,714 B1 | 12/2010 | Moberg et al. |
| 7,865,893 B1 | 1/2011 | Omelyanchuk et al. |
| 7,865,908 B2 | 1/2011 | Garg et al. |
| 7,885,276 B1 | 2/2011 | Lin |
| 7,936,770 B1 | 5/2011 | Frattura et al. |
| 7,941,812 B2 | 5/2011 | Sekar et al. |
| 7,948,986 B1 | 5/2011 | Ghosh et al. |
| 7,958,506 B2 | 6/2011 | Mann |
| 7,983,257 B2 | 7/2011 | Chavan et al. |
| 7,984,108 B2 | 7/2011 | Landis et al. |
| 7,987,432 B1 | 7/2011 | Grechishkin et al. |
| 7,995,483 B1 | 8/2011 | Bayar et al. |
| 8,001,214 B2 * | 8/2011 | Loefstrand .......... H04L 67/2814 370/328 |
| 8,018,873 B1 | 9/2011 | Kompella |
| 8,019,837 B2 | 9/2011 | Kannan et al. |
| 8,027,354 B1 | 9/2011 | Portolani et al. |
| 8,031,606 B2 | 10/2011 | Memon et al. |
| 8,031,633 B2 | 10/2011 | Bueno et al. |
| 8,036,127 B2 | 10/2011 | Droux et al. |
| 8,051,180 B2 | 11/2011 | Mazzaferri et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,065,714 B2 | 11/2011 | Budko et al. |
| 8,068,602 B1 | 11/2011 | Bluman et al. |
| RE43,051 E | 12/2011 | Newman et al. |
| 8,127,291 B2 | 2/2012 | Pike et al. |
| 8,146,148 B2 | 3/2012 | Cheriton |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,166,205 B2 | 4/2012 | Farinacci et al. |
| 8,199,750 B1 | 6/2012 | Schultz et al. |
| 8,223,668 B2 | 7/2012 | Allan et al. |
| 8,248,967 B2 * | 8/2012 | Nagy .................. H04L 12/4641 370/254 |
| 8,265,075 B2 | 9/2012 | Pandey |
| 8,281,067 B2 | 10/2012 | Stolowitz |
| 8,289,975 B2 * | 10/2012 | Suganthi ........... H04L 29/12339 370/395.53 |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,386,642 B2 | 2/2013 | Elzur |
| 8,401,024 B2 | 3/2013 | Christensen et al. |
| 8,538,919 B1 | 9/2013 | Nielsen et al. |
| 8,549,281 B2 * | 10/2013 | Samovskiy ......... H04L 12/4641 713/151 |
| 8,611,351 B2 | 12/2013 | Gooch et al. |
| 8,619,771 B2 | 12/2013 | Lambeth et al. |
| 8,625,603 B1 | 1/2014 | Ramakrishnan et al. |
| 8,627,313 B2 | 1/2014 | Edwards et al. |
| 8,644,188 B1 | 2/2014 | Brandwine et al. |
| 8,683,464 B2 | 3/2014 | Rozee et al. |
| 8,798,056 B2 | 8/2014 | Ganga |
| 8,838,743 B2 | 9/2014 | Lewites et al. |
| 9,172,615 B2 * | 10/2015 | Samovskiy ......... H04L 12/4641 |
| 9,306,910 B2 | 4/2016 | Lambeth et al. |

(56) References Cited

U.S. PATENT DOCUMENTS

| | | |
|---|---|---|
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2004/0073659 A1 | 4/2004 | Rajsic et al. |
| 2004/0098505 A1 | 5/2004 | Clemmensen |
| 2004/0249973 A1 | 12/2004 | Alkhatib et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0071446 A1 | 3/2005 | Graham et al. |
| 2005/0083953 A1 | 4/2005 | May |
| 2005/0120160 A1 | 6/2005 | Plouffe et al. |
| 2005/0182853 A1 | 8/2005 | Lewites et al. |
| 2005/0220096 A1 | 10/2005 | Friskney et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0221961 A1 | 10/2006 | Basso et al. |
| 2006/0245438 A1 | 11/2006 | Sajassi et al. |
| 2006/0291388 A1 | 12/2006 | Amdahl et al. |
| 2007/0050520 A1 | 3/2007 | Riley |
| 2007/0055789 A1 | 3/2007 | Claise et al. |
| 2007/0064673 A1 | 3/2007 | Bhandaru et al. |
| 2007/0064704 A1* | 3/2007 | Balay .............. H04L 45/00 370/392 |
| 2007/0130366 A1 | 6/2007 | O'Connell et al. |
| 2007/0156919 A1 | 7/2007 | Potti et al. |
| 2007/0195794 A1 | 8/2007 | Fujita et al. |
| 2007/0234302 A1 | 10/2007 | Suzuki et al. |
| 2007/0260721 A1 | 11/2007 | Bose et al. |
| 2007/0280243 A1 | 12/2007 | Wray et al. |
| 2007/0286137 A1 | 12/2007 | Narasimhan et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0028401 A1 | 1/2008 | Gesinger |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Her |
| 2008/0163207 A1 | 7/2008 | Reumann et al. |
| 2008/0198858 A1 | 8/2008 | Townsley et al. |
| 2008/0209415 A1 | 8/2008 | Van Riel et al. |
| 2008/0215705 A1 | 9/2008 | Liu et al. |
| 2008/0244579 A1 | 10/2008 | Muller |
| 2009/0141729 A1 | 6/2009 | Fan |
| 2009/0150527 A1 | 6/2009 | Tripathi et al. |
| 2009/0199291 A1* | 8/2009 | Hayasaka .......... H04L 63/0227 726/14 |
| 2009/0254990 A1 | 10/2009 | McGee |
| 2009/0292858 A1 | 11/2009 | Lambeth et al. |
| 2010/0107162 A1 | 4/2010 | Edwards et al. |
| 2010/0115101 A1 | 5/2010 | Lain et al. |
| 2010/0115606 A1* | 5/2010 | Samovskiy ........ H04L 12/4641 726/15 |
| 2010/0125667 A1 | 5/2010 | Soundararajan |
| 2010/0131636 A1 | 5/2010 | Suri et al. |
| 2010/0138830 A1 | 6/2010 | Astete et al. |
| 2010/0169880 A1 | 7/2010 | Haviv et al. |
| 2010/0180275 A1 | 7/2010 | Neogi et al. |
| 2010/0191881 A1 | 7/2010 | Tauter et al. |
| 2010/0214949 A1 | 8/2010 | Smith et al. |
| 2010/0235831 A1 | 9/2010 | Dittmer |
| 2010/0254385 A1 | 10/2010 | Sharma et al. |
| 2010/0257263 A1 | 10/2010 | Casado et al. |
| 2010/0275199 A1 | 10/2010 | Smith et al. |
| 2010/0281478 A1 | 11/2010 | Sauls et al. |
| 2010/0306408 A1 | 12/2010 | Greenberg et al. |
| 2010/0306773 A1 | 12/2010 | Lee et al. |
| 2010/0333189 A1 | 12/2010 | Droux et al. |
| 2011/0022694 A1 | 1/2011 | Dalal et al. |
| 2011/0022695 A1 | 1/2011 | Dalal et al. |
| 2011/0023031 A1 | 1/2011 | Bonola et al. |
| 2011/0194567 A1 | 8/2011 | Shen |

OTHER PUBLICATIONS

Author Unknown, "Introduction to VMware Infrastructure: ESX Server 3.5, ESX Server 3i version 3.5, VirtualCenter 2.5," Revision Dec. 13, 2007, 46 pages, VMware, Inc., Palo Alto, California, USA.

Author Unknown, "iSCSI SAN Configuration Guide: ESX Server 3.5, ESX Server 3i version 3.5, VirtualCenter 2.5," Nov. 2007, 134 pages, Revision: Nov. 29, 2007, VMware, Inc., Palo Alto, California, USA.

Author Unknown, "Virtual Machine Mobility Planning Guide," Oct. 2007, 33 pages, Revision 20071018, VMware, Inc., Palo Alto, California.

Author Unknown, "VMware Infrastructure 3 Primer: ESX Server 3.5, ESX Server 3i version 3.5, VirtualCenter 2.5," Nov. 2007, 22 pages, Revision: Nov. 29, 2007, VMware, Inc., Palo Alto, California, USA.

* cited by examiner

Network N5 Addressing Mode Table in Host 2

| Destination | Function | Address to use for destination |
|---|---|---|
| Broadcast | IP Multicast encapsulate | IP Multicast address |
| Unicast C-L2 | No modification | Unicast C |
| Unicast D-L2 | No modification | Unicast D |
| Unicast F-L2 | Translate L2 address | Unicast F'-L2 |
| Unicast G-L2 | Translate L2 address | Unicast G'-L2 |
| ... | | |

Fig. 7A

Network N2 Addressing Mode Table in Host 2

| Destination | Function | Address to use for destination |
|---|---|---|
| Broadcast | IP Multicast encapsulate | IP Multicast address |
| Unicast A-L2 | No modification | Unicast A-L2 |
| Unicast B-L2 | No modification | Unicast B-L2 |
| Unicast E-L2 | Translate L2 address | Unicast E'-L2' |
| Unicast J-L2 | IP Encapsulate | Host 1 PN2 IP Address |
| ... | | |

Fig. 7B

PRIVATE ALLOCATED NETWORKS OVER SHARED COMMUNICATIONS INFRASTRUCTURE

CLAIM OF BENEFIT TO PRIOR APPLICATION

This application is a continuation application of U.S. Non-Provisional patent application Ser. No. 14/059,413, filed Oct. 21, 2013, now published as U.S. Publication 2014/0112343. U.S. Non-Provisional patent application Ser. No. 14/059,413 is a continuation of U.S. Non-Provisional patent application Ser. No. 12/571,224, filed Sep. 30, 2009, now issued as U.S. Pat. No. 8,619,771. U.S. Patent Publication 2014/0112343 and U.S. Pat. No. 8,619,771 are incorporated herein by reference.

CROSS REFERENCE TO RELATED APPLICATIONS

This application is related to U.S. patent application Ser. No. 12/510,072, filed Jul. 27, 2009, and entitled "AUTOMATED NETWORK CONFIGURATION OF VIRTUAL MACHINES IN A VIRTUAL LAB ENVIRONMENT", now issued as U.S. Pat. No. 8,924,524; and U.S. patent application Ser. No. 12/510,135, filed Jul. 27, 2009, and entitled "MANAGEMENT AND IMPLEMENTATION OF ENCLOSED LOCAL NETWORKS IN A VIRTUAL LAB", now issued as U.S. Pat. No. 8,838,756, which are incorporated herein by reference.

FIELD OF THE INVENTION

The present invention relates to methods and systems for implementing private allocated networks (PAN), and more particularly, methods and systems for implementing isolated PANs that share the same communication physical media.

DESCRIPTION OF THE RELATED ART

Virtualization of computer resources generally involves abstracting computer hardware, which essentially isolates operating systems and applications from underlying hardware. Hardware is therefore shared among multiple operating systems and applications wherein each operating system and its corresponding applications are isolated in corresponding virtual machines (VM) and wherein each VM is a complete execution environment. As a result, hardware can be more efficiently utilized.

The virtualization of computer resources sometimes requires the virtualization of networking resources. To create a private network in a virtual infrastructure means that a set of virtual machines have exclusive access to this private network. However, virtual machines can be located in multiple hosts that may be connected to different physical networks. Trying to impose a private network on a distributed environment encompassing multiple physical networks is a complex problem. Further, sending a broadcast message in a private network presents two problems. First, the broadcast may be received by hosts which do not host any VMs in the private network, thus reducing the scalability of the entire distributed system. Second, if hosts are not located on adjacent layer 2 networks, the broadcast may not reach all hosts with VMs in the private network.

Virtual Local Area Networks (VLAN) are sometimes used to implement distributed networks for a set of computing resources that are not connected to one physical network. A VLAN is a group of hosts that communicate as if they were attached to the Broadcast domain, regardless of their physical location. A VLAN has the same attributes as a physical Local Area Network (LAN), but the VLAN allows for end stations to be grouped together even if the end stations are not located on the same network switch. Network reconfiguration can be done through software instead of by physically relocating devices. Routers in VLAN topologies provide broadcast filtering, security, address summarization, and traffic flow management. However, VLANs only offer encapsulation and, by definition, switches may not bridge traffic between VLANs as it would violate the integrity of the VLAN broadcast domain. Further, VLANs are not easily programmable by a centralized virtual infrastructure manager.

SUMMARY

Embodiments of the present invention provide methods and systems for implementing private allocated networks in a virtual infrastructure are presented. One method operation creates virtual switches in one or more hosts in the virtual infrastructure. Each port in the virtual switches is associated with a private allocated network (PAN) from a group of possible PANs. The intranet traffic within each PAN is not visible to nodes that are not connected to the each PAN. In another operation, the method defines addressing mode tables for the intranet traffic within each PAN. The entries in the addressing mode tables define addressing functions for routing the intranet traffic between the virtual switches, and types of addressing functions are supported by the virtual switches.

It should be appreciated that the present invention can be implemented in numerous ways, such as a process, an apparatus, a system, a device or a method on a computer readable medium. Several inventive embodiments of the present invention are described below.

In one embodiment, a method includes an operation for sending a packet from a virtual machine to a virtual switch in a host where the virtual machine is executing. The packet is sent from a network interface in the virtual machine connected to a PAN. Further, the method checks an addressing mode table in the virtual switch to determine an addressing function corresponding to a destination node for the packet. The addressing function is defined for muting intranet PAN traffic between virtual switches connected to the PAN, where different types of addressing functions are supported by each virtual switch. Another method operation sends the packet to the destination using the determined addressing function.

In another embodiment, a virtual switch in a first host for implementing private allocated networks in a virtual infrastructure is defined. The virtual switch includes a first group of ports, a second group of ports, and an addressing mode table. The first group of ports is associated with a first PAN, and the second group of ports is associated with a second PAN. The first and the second PAN share the same physical media for data transmission, and the intranet traffic within the first PAN is not visible to nodes that are not directly connected to the first PAN. The addressing mode table is characterized for the intranet traffic within the first PAN. An entry in the addressing mode table defines an addressing function for routing intranet traffic originated at the first group of ports, where layer 2 address translation is used for intranet traffic from the first group of ports to a virtual machine in a second host connected to the same physical media. Layer 3 encapsulation is used for intranet traffic from the first group of ports to a virtual machine in a third host not connected to the same physical media.

In yet another embodiment, a system for network communications in a virtual infrastructure includes one or more physical networks and a plurality of hosts connected to the physical networks. Each host includes a virtual switch and addressing mode tables. Each port in the virtual switch is associated with one of a plurality of PANs. Nodes in each PAN have the same network address associated with the each PAN, and each port can be associated with any of the PANs. Further, the intranet PAN traffic between two hosts on different physical networks travels through the two different physical networks. The addressing mode tables are defined for each PAN, where an entry in the addressing mode table defines an addressing function for routing the intranet PAN traffic between the plurality of hosts. Different types of addressing functions are supported by the plurality of hosts.

BRIEF DESCRIPTION OF THE DRAWINGS

FIGS. 7A-7B present two embodiments of network addressing mode tables.

DETAILED DESCRIPTION

Figure 1:
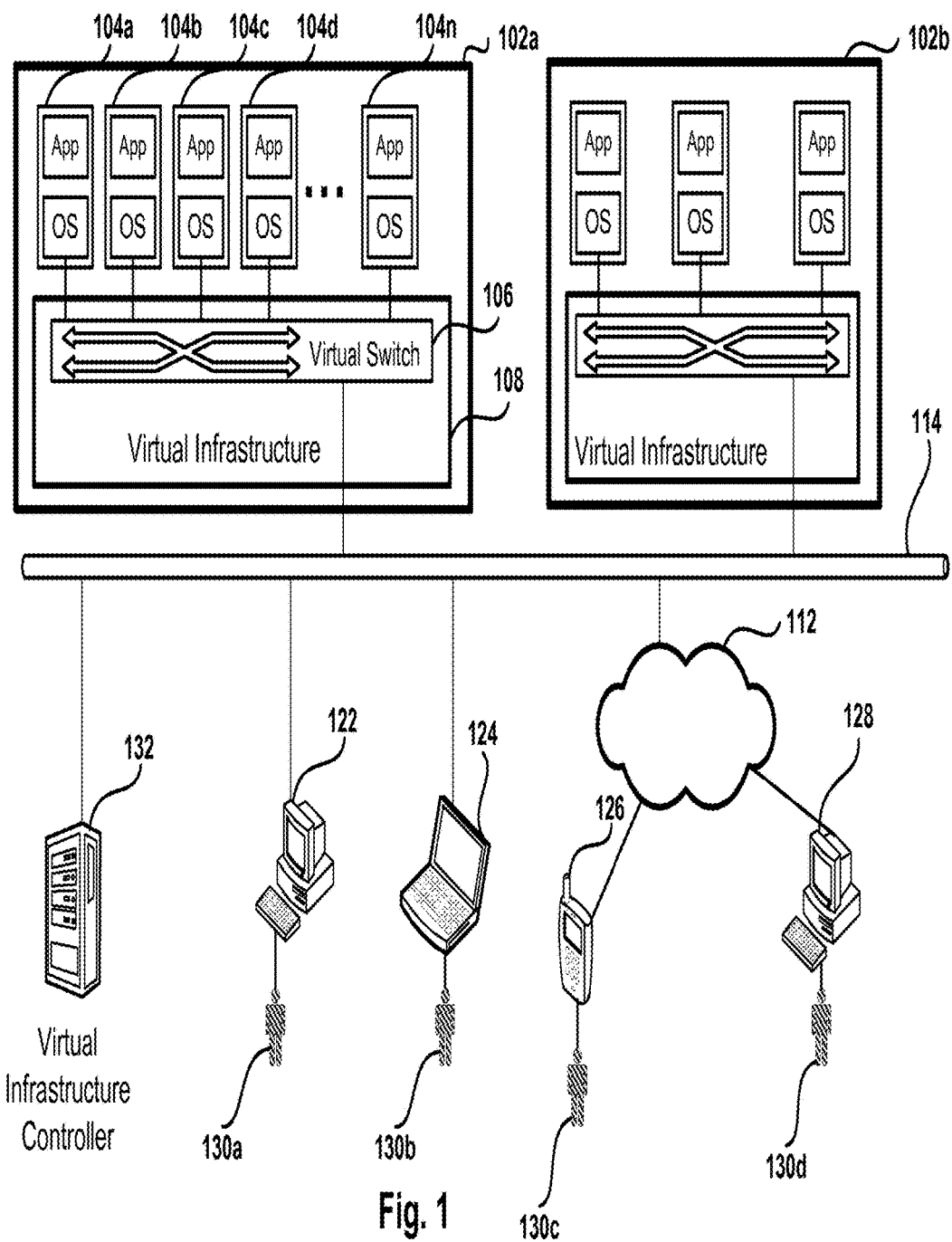
FIG. 1 depicts a remote desktop environment including a virtual infrastructure controller, according to one embodiment.

FIG. 1 depicts a remote desktop environment including a virtual infrastructure controller, according to one embodiment. The environment depicted in FIG. 1 includes enterprise servers 102a-102b, also referred to herein as hosts, that provide virtual desktop services to remote users 130a-130d. Although embodiments are described within a virtual desktop system and virtual machines (VM), the embodiments presented can be used in environments where several servers are used to support processes which can be hosted by any of the servers. Some embodiments below are described with respect to VMs, but the same principles apply to processes running on a multi-host environment.

The architecture of a virtualized computer system is shown in FIG. 1 with some components omitted for simplification purposes. The virtualized computer system includes VMs 104a-104n, and virtual infrastructure 108. Among other things, virtual infrastructure 108 manages the assignment of VMs 104a-104n to remote users. As shown in FIG. 1, each VM includes a Guest Operating System (GOS) supporting applications running on the GOS. Virtual infrastructure layer 108 also includes Virtual Switch 106 that provides network connectivity services to VMs 104a-104n. Virtual Infrastructure Controller 132 manages the operation of the hosts in the infrastructure, which includes allocating VMs to hosts, migrating VMs between hosts, configuring networks, etc.

As further shown in FIG. 1, remote users 130a-130d utilize devices 122, 124, 126 and 128, respectively, which act as clients in the remote desktop environment. Devices 122, 124, 126 and 128 provide display presentation and input/output capabilities associated with VMs 104a-104n. The devices include Personal Computers (PC) 122 and 128, laptop 124, and a Personal Digital Assistant (PDA) (mobile phone 126). As further shown in FIG. 1, the devices can communicate with the hosts over the same private network 114 as the hosts, or they can communicate with the hosts remotely via network 112.

Figure 2:
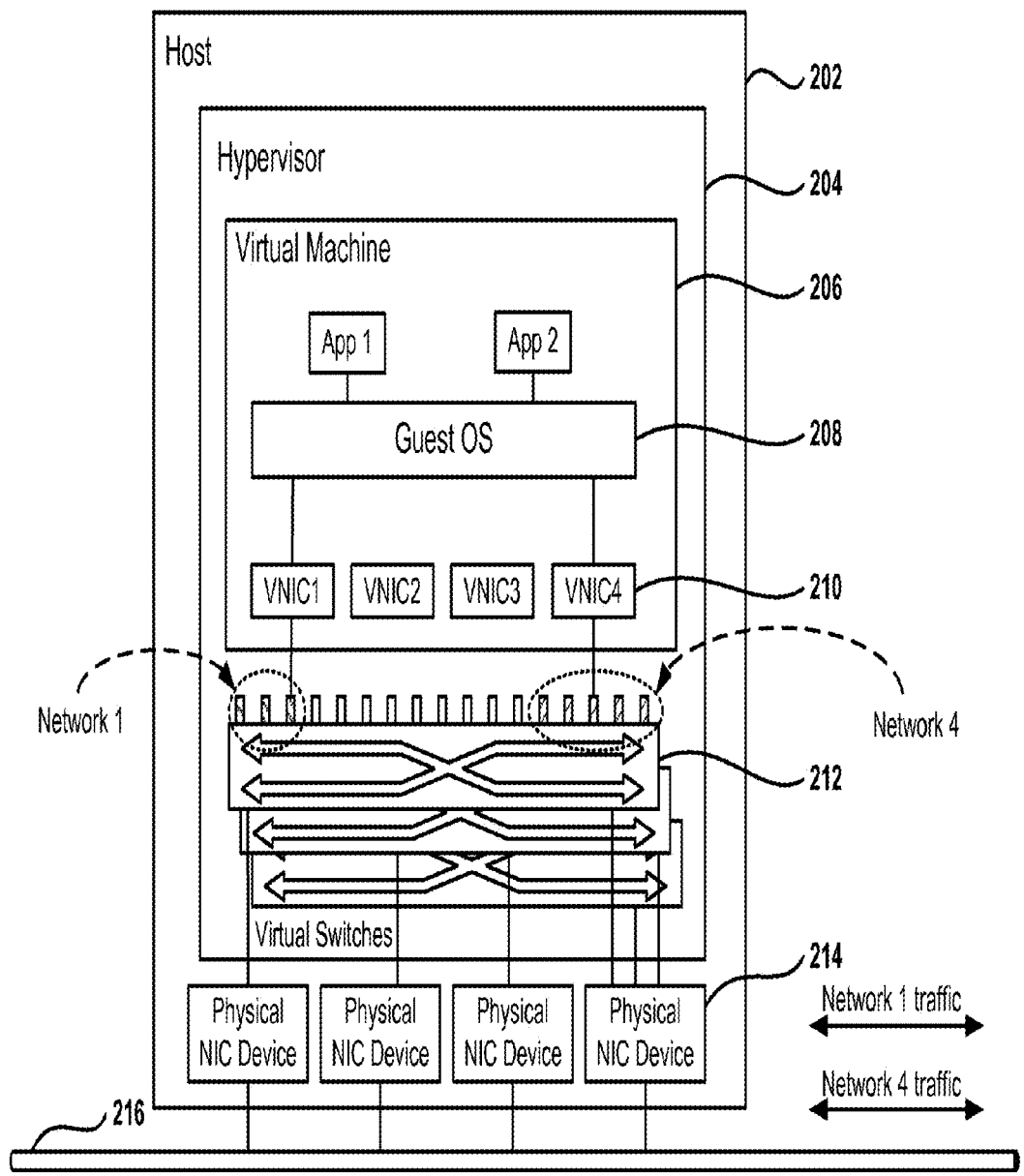
FIG. 2 depicts one embodiment of the host architecture for instantiating Virtual Machines (VM) with multiple Virtual Network Interface Cards (VNIC).

FIG. 2 depicts one embodiment of the host architecture for instantiating VMs with multiple Virtual Network Interface Cards (VNIC). Hypervisor 204, also referred to as virtual infrastructure layer, manages the assignment of VMs 206 in host 202 to remote users. VM 206 includes Guest Operating System (GOS) 208 and multiple VNICs 210. Each VNIC 210 is connected to a virtual switch (VSwitch) 212 that provides network switch functionality for the network interfaces. VSwitches 212 are connected to a physical NIC device in the host to connect the VMs to network 216. Each of the VNICs and VSwitches are independent, thus a VM can connect to several networks via several VNICs that connect to one or more physical NIC devices 214. In another embodiment, each VSwitch 212 is connected to a different physical NIC device, thus each VSwitch 212 provides connectivity for networks implemented on the corresponding network attached to the physical NIC device. For example, in the embodiment illustrated in FIG. 2, physical network 216 carries traffic for two different networks, Network 1 and Network 4. Network 1 and Network 4 are two network overlays operating on the same physical network 216. VSwitch 212 assigns a set of ports to Network 1 and a different set of ports to Network 4, where each set of ports supports Media Access Control (MAC) addressing for the corresponding network. Thus, packets from Network 1 coexist with packets from Network 4 on the same transmission media.

The network overlays are configured to have separate Layer 2 (Ethernet) and Layer 3 (Internet Protocol) addressing from the underlying physical infrastructure, allowing a physical network or a PAN to have different subnet masks, gateways, and IP address pools from the underlying physical network. Further, the PANs may be connected to a virtual router in order to provide connectivity to the underlying physical network infrastructure or another PAN via a gateway or default router.

Figure 3:
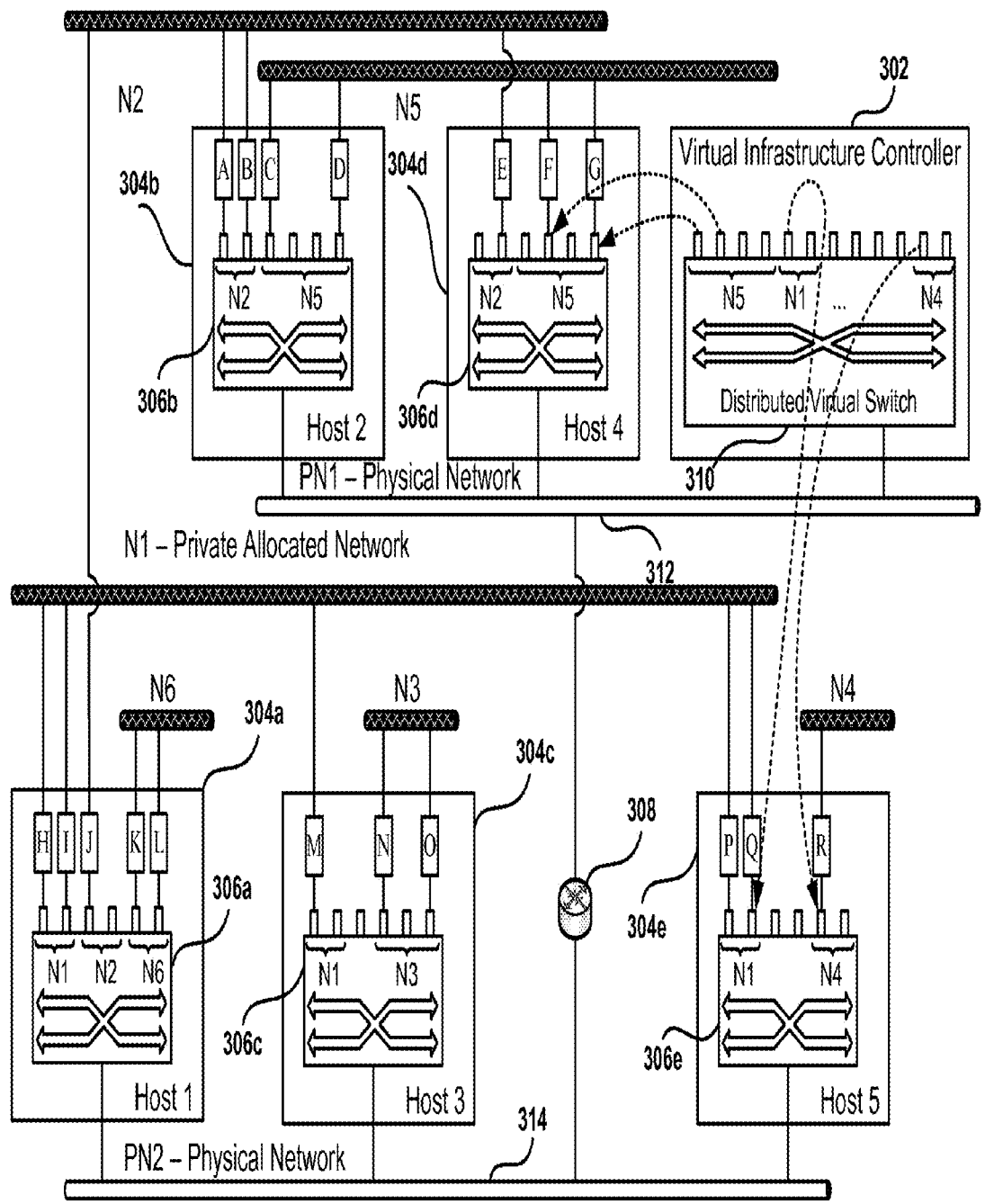
FIG. 3 illustrates the implementation of Private Allocated Networks (PAN) in a virtual infrastructure, according to one embodiment.

FIG. 3 illustrates the implementation of Private Allocated Networks in a virtual infrastructure, according to one embodiment. Virtual Infrastructure Controller 302 manages a virtual infrastructure with hosts 1-5 304a-304e. Physical Networks PN1 and PN2, together with router 308, enable the hosts to communicate and VMs A-R execute on hosts 1-5. The administrator of this environment wishes to create multiple private networks, also referred to herein as Private Allocated Networks (PAN) or network overlays, which are independent from each other. A PAN defines a layer 2 broadcast domain. In case of an IP PAN network, all the nodes in the PAN have the same subnet network address and a different nodal address. Typically, each PAN is under the control of a different administrator. For example, each business unit in a large corporation may have its own network, or networks are allocated to different functions within a company, such as having a network for lab testing completely isolated from networks that run mission-critical operations such as order processing. Having independent networks means that the addressing schemes within each network can not affect the operation of other networks, and that the networks are protected from outside entities that are not properly authorized to establish a network connection. Additionally, each administrator must be free to define the addressing scheme used in the networks under the control of the administrator, independently of how other administrators configure their networks. Networking layer 2 and layer 3 addresses can be the same in different VMs connected to different PANs, but the overlap must not affect the normal operation of the VMs, the network, nor the virtual infrastructure. Having independent networks also means isolation of the physical infrastructure from the view of each VM. In other PAN scenarios, an administrator breaks down a large physical network into a set of smaller networks, or combines small subnets into a large network without having to change the configurations and connections of the network equipment.

In the virtual infrastructure environment of FIG. 3 all hosts run virtualization software, which is centrally managed. Additionally, all the nodes are well behaved and controlled. The central management allows the implementation of solutions that may be harder to implement on open networking environments where the nodes are not controlled by a central entity. However, the person skilled in the art will readily appreciate that many of the principles described herein can also be used in open networking environments with little or no modification.

There are three basic tools used to implement overlay networks: filtering, encapsulation or address translation, and forwarding. The filtering function assigns all traffic to a given overlay or set of overlays upon ingress, and prevents traffic from passing between segments which must be isolated from one another. The encapsulation function prevents unintended routing of packets by the physical switching and routing equipment when there is overlapping duplicate addresses within separate isolated segments. Further, the encapsulation function tunnels traffic within a given logical segment across disparate physical segments. The forwarding function provides feedback to the core forwarding engine which may make implicit assumptions based on whether a suitable local unicast destination is available or not.

Embodiments of the invention add optimization to the virtual infrastructure networking stack to enable the virtual infrastructure to:

- Protect the physical network from overlapping MAC and IP addresses in different administration domains.
- Divide a large shared physical network into smaller isolated networks to provide multi-tenancy capabilities. This means preventing traffic from leaking between isolated networks, restricting broadcast domains to only the set of physical switches actually servicing a given isolated network, and enabling the deployment of a single large layer 2 network with no spanning tree running at the physical access layer, or with optimized spanning tree compared to traditional networks because there is no need for loops built into the network as redundancy can be handled at the edges by the hypervisors, and there is no need to run spanning tree over multiple VLANs.
- Aggregate a collection of separate subnets into a larger logical network, which can be subdivided to combine multi-tenancy with availability zones. This aggregation allows the traditional use of spanning tree for redundancy since each subnet is its own spanning tree domain. As a result, logical broadcast domains are stretched beyond physical broadcast boundaries (subnets).
- Support elastic overlay networks that can "stretch" or "contract" across L2 and L3 boundaries.
- Optionally, allows placement of VMs in the virtual infrastructure so as to improve performance. For example, Distributed Resource Scheduling (DRS) or other placement mechanisms can be used to physically collocate VMs in the same logical private network. As a result, bisectional bandwidth becomes less critical to the performance of the overall network, allowing overcommit (or at least less overprovision). In addition, more aggressive power saving mechanisms can be implemented for idle switches, and the number of hosts sharing any one group membership table can be limited.

Virtual infrastructure controller (VIC) 302 allocates unique MAC addresses to each VM's NIC for use in Physical Networks. The PAN administrator allocates MAC addresses to the VMs for internal use within the PAN, but ultimately the PAN packets may need to use a physical network and when the PAN packets travel in the physical network the PAN packets must have unique addresses to avoid delivery problems. VIC 302 also associates VMs with the corresponding PANs and pushes addressing mode tables to the hosts of the virtual infrastructure. The addressing mode tables, also referred to as translation tables or lookup tables, are described in more detail below in reference to FIGS. 7A-7B. In another embodiment, the addressing mode tables are built by each of the hosts without the cooperation from VIC 302. Hosts 304a-304e associate individually outgoing frames with one of the PANs and decide which PAN corresponds to each received frame. Additionally, the hosts enforce the isolation between PANs and maintain the addressing mode tables.

The approach to implement PANs over one or more physical networks is elastic as embodiments of the invention do not rely on a single approach or method for transferring packets. Different encapsulation and translation mechanisms are utilized, including leaving a packet unchanged when the destination of the packet is in the same virtual switch as the VM transmitting the packet. Further, embodiments of the invention are compatible with other networking aggregation mechanisms, such as VLANs, because all the operations on packets are performed at the hosts. While PAN packets are travelling on physical networks, the PAN packets behave as regular network packets. Physical network switches and routers are not aware of the network overlays, and there is no need of complex management of switches and routers, which may be geographically dispersed or under the management control of multiple entities.

Referring back to FIG. 3, physical networks PN1 312 and PN2 314 support connections to hosts 304a-304e and VIC 302. On top of this physical network infrastructure, six different PANs N1-N6 have been created for the VMs in the infrastructure. For example, PAN N2 includes VMs J in host 1, A and B in host 2, and E in host 4. The VMs are connected to VSwitches 306a-306e, as previously described in FIG. 2. Although FIG. 3 shows one VSwitch per host, there can be more than one VSwitch instantiated within a host to perform the VSwitch functionality. Each VSwitch assigns ports to one or more PANs implemented in the host. For example, VSwitch 306b has assigned two ports to PAN N2 and four ports to PAN N5. It should be noted, that hosts need not implement all the PANs in the virtual infrastructure, but only the PANs that have VMs in the host.

VIC 302 allocates PANs to VMs and the ports in the VSwitches where the VMs connect to the PAN. Distributed Virtual Switch 310 in VIC 302 is a symbolic representation of these assignments, where the master Distributed Virtual Switch 310 has an allocation for all VMs. Each port in Distributed Virtual Switch 310 corresponds to a port in a host VSwitch, as shown by some of the arrows coming out of Distributed Virtual Switch 310 (not all ports in Distributed Virtual Switch 310 and arrows are shown for clarity).

It should be noted that one advantage of a virtual infrastructure is that there is no need to artificially constrain broadcasts, mainly used when nodes do not know about each other. In the architecture shown in FIG. 3, all the nodes can get information about other nodes because of the virtual infrastructure layer. For example, a VM can get the Ethernet address of another VM from the virtual infrastructure that knows the addresses of all the VMs. Nevertheless, standard networking methods are also available, such as using Address Resolution Protocol (ARP). However, other embodiments follow a different approach where the virtual infrastructure handles all cases of broadcast, and the virtual infrastructure avoids intruding into the guest OS.

Figure 4:
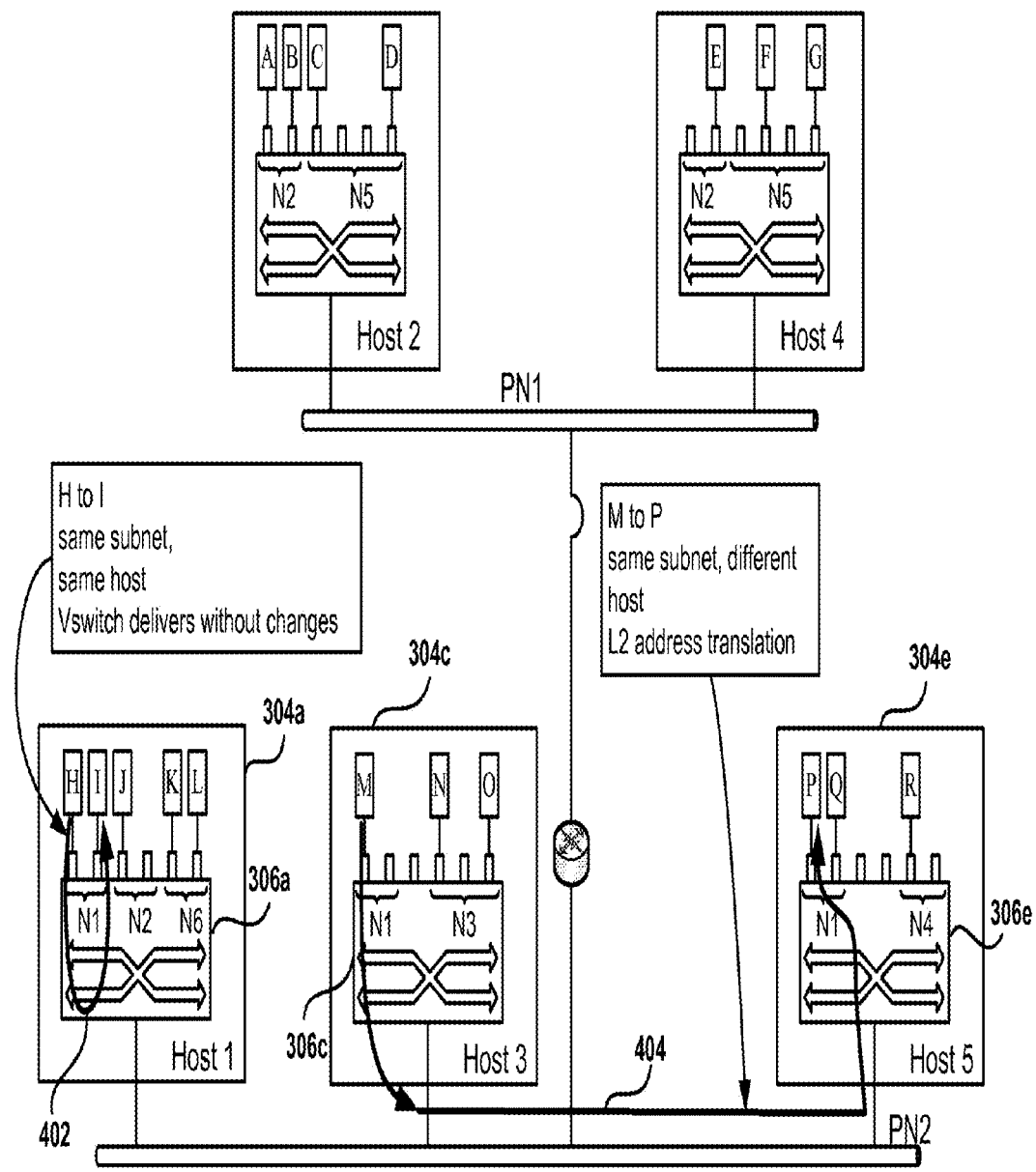
FIG. 4 illustrates the transmission of PAN packets between hosts connected to the same physical network, according to one embodiment.

FIG. 4 illustrates the transmission of PAN packets between hosts connected to the same physical network, according to one embodiment. The system in FIG. 4 is the same system as the one of FIG. 3, but some elements have been omitted for clarity. When a packet is transmitted from VM H to VM I using PAN N1, VSwitch 306a receives the packet in the port attached to VM H. VSwitch 306a examines the layer 2 destination address and determines that the packet is destined to node I, also in PAN N1 and in the same virtual switch. Because the destination is local within the VSwitch, the packet is delivered 402 by VSwitch 306a to the port attached to VM I without changing any data in the packet. Network based applications and services which parse beyond the Ethernet header should not be impacted because there are not any additional data fields or headers added to the packet, which is the case when encapsulation is used.

A second scenario includes sending an IP packet from VM M in host 304c to VM P in host 304e. Since the destination is in a different host, the packet must travel through the physical network. As previously discussed, the Ethernet addresses in different PANs may be controlled by different administrators, each with complete freedom to determine how to assign MAC addresses to VMs. This may cause the duplication of MAC addresses, and since a VM's MAC address may not be unique, there must be a mechanism in place to avoid wrongful delivery of packets. This is avoided by assigning a unique MAC address to each VM, which we refer to as the "external" MAC address, and the unique MAC address is used on the physical networks. The MAC addresses used within each PAN are referred to as the "internal" MAC addresses because the MAC addresses are only valid within the corresponding PAN. This assignment can be performed by VIC 302, as seen in FIG. 3.

As a result, the packet sent by VM M is received by VSwitch 306c, which determines that the destination is in the same PAN and in a different host. Since the remote host 304a is in the same physical network PN2, the packet can be sent using MAC address translation. VSwitch 306c changes the destination MAC address to VM P's external MAC address and then sends the packet 404 via network PN2 to VSwitch 306e, where the process is reversed. VSwitch 306e recognizes that the packet came from the physical network and that it is destined to VM P's external address, and VSwitch 306c then changes the destination address in the packet back to the original "internal" address for VM P in PAN N1. A similar process takes place with the source MAC addresses to use external addresses in the physical network and internal addresses within the PAN.

Network based applications and services which parse beyond the Ethernet header should not be impacted in this case either, since additional data fields are not added to the packet. It should be noted that if the host participates in protocols which embed the MAC in the payload, such as Address Resolution Protocol (ARP), then a translation handler for each relevant protocol must be implemented on the host.

Other embodiments may use different ways of sending packets between hosts. For example, the packet may be sent from VSwitch 306c to VSwitch 306e using packet encapsulation. This method may require packet fragmentation because of the added data fields, as well as additional processing to add and deleted the packet extra fields. The important thing to keep in mind is the flexibility and ability to customize how packets are send within a PAN. More details are given below on how customization takes place by using Addressing Mode Tables described in reference to FIGS. 7A-7B.

Figure 5:
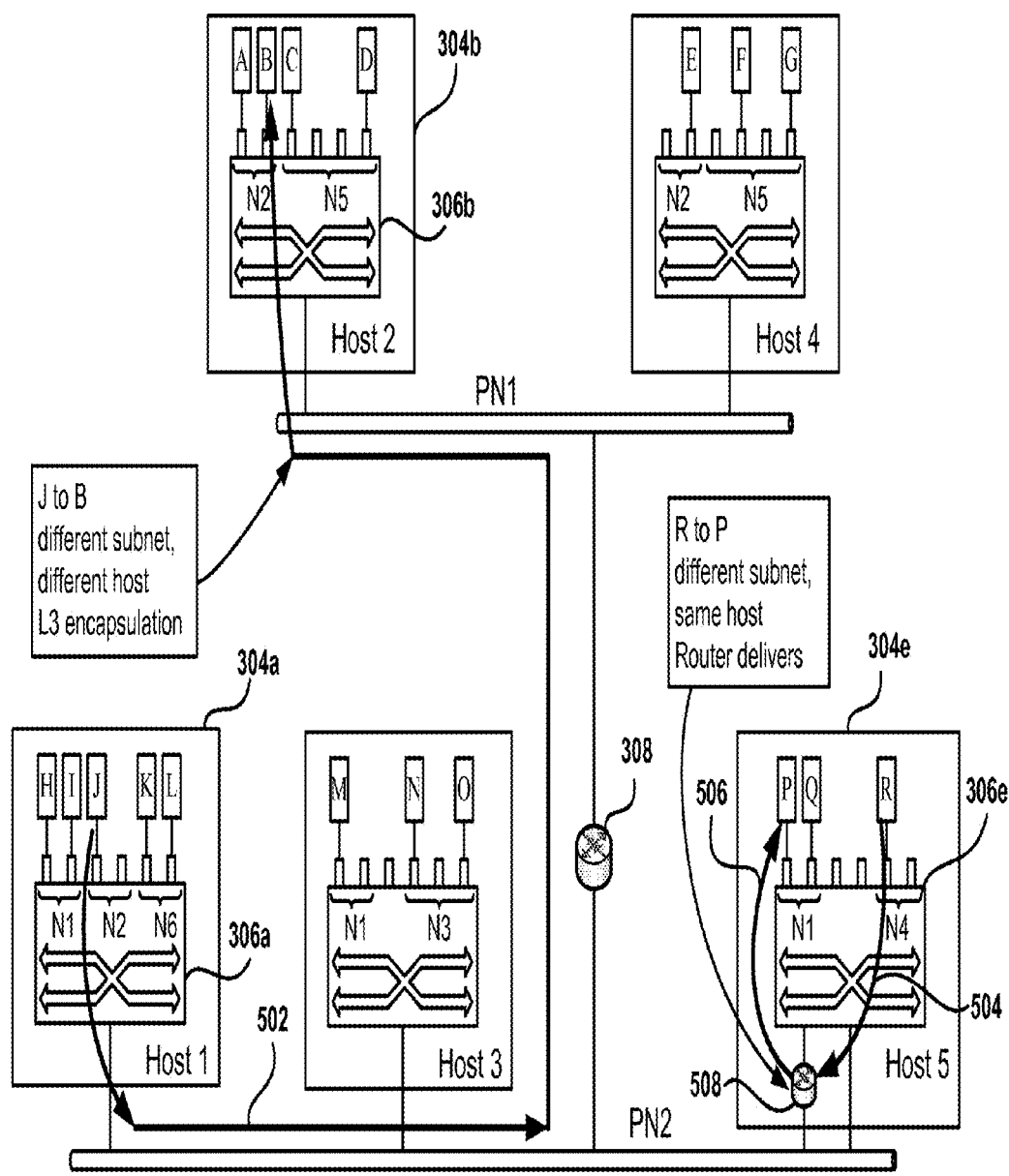
FIG. 5 illustrates the transmission of PAN packets between physical networks and within a host, in accordance with one embodiment.

FIG. 5 illustrates the transmission of PAN packets between physical networks and within a host, in accordance with one embodiment. When VM J in PAN N2 sends a packet to V M B also in PAN2, the packet must travel to a different host located on a remote physical network PN1. In one embodiment, IP encapsulation is used by adding Ethernet and IP headers to the Ethernet packet. Because the packet's destination is VM B, VSwitch 306 determines that the packet needs to be delivered to host 304b. The added IP header includes the IP address of host 304b as well as other information regarding the encapsulation of the packet, such as reserved bits. In one embodiment, encapsulated packets include metadata (such as explicit PAN identification). In another embodiment, metadata is not used, and PAN identification is implicit in the encapsulation address. In both embodiments only hosts which implement the PAN will see the traffic for the PAN.

The encapsulated IP packet 502 is sent to router 308 (the added Ethernet header has router 308's Ethernet address for destination), which forwards the packet to host 304b. VSwitch 306b determines that the packet is encapsulated, removes the encapsulation headers, and determines delivery for VM B by examining the Ethernet address in the packet (VM B's external Ethernet address). It should be noted that there may be a case when two hosts implement the same PAN, where the two hosts do not share a connection to a physical network and where there is no router on the network that can be used to send packets between the two hosts. In this case, a way to communicate the hosts must be found, such as using an intermediary host with connectivity to both hosts. In this case, a packet originating in one host is sent to the intermediary host, which forwards the packet to the destination host. As previously discussed, translation or encapsulation can be used at each leg of the communication. In one embodiment, the intermediary host implements the same PAN as the other two hosts, but in another embodiment, the intermediary does not implement the same PAN and merely acts as a special router controlled by the virtual infrastructure.

As previously discussed, PANs are implemented as isolated networks which do not require knowledge of the existence of other PANs. However, one administrator can configure several PANs and enable communication among them. In this case, nodes in one of the PANs are aware of other nodes in different PANs and use standard networking protocols to communicate with these nodes. For example, in the case where VM R in PAN N4 sends a packet to VM P in PAN N1, the virtual infrastructure is able to deliver this packet by using a virtual router to facilitate the connection between PANs. In different embodiments, the virtual router can be located in different systems, such as in the source host, in the destination host, or somewhere else on the network. In the example shown in FIG. 5, virtual router 508 is located inside host 304e.

VSwitch 306e sends the packet 504 received from VM R to virtual router 508, which then forwards the packet 506 back to VSwitch 306e for delivery to VM P. Since the packet does not have to travel on a physical network, there is no need for translation or encapsulation. In one embodiment, the virtual router is implemented as a VM which can perform the usual router functions such as encapsulation, decapsulation, and translation. In the case that inter-PAN traffic, that is traffic between PANs, requires that a packet traverses at least one physical network, encapsulation or translation can be used as previously described. We will refer to intranet PAN traffic herein as traffic whose source and destination are in the same PAN, which is the same as saying that an intranet PAN packet has source and destination layer 3 addresses from the same network (the PAN network).

Figure 6:
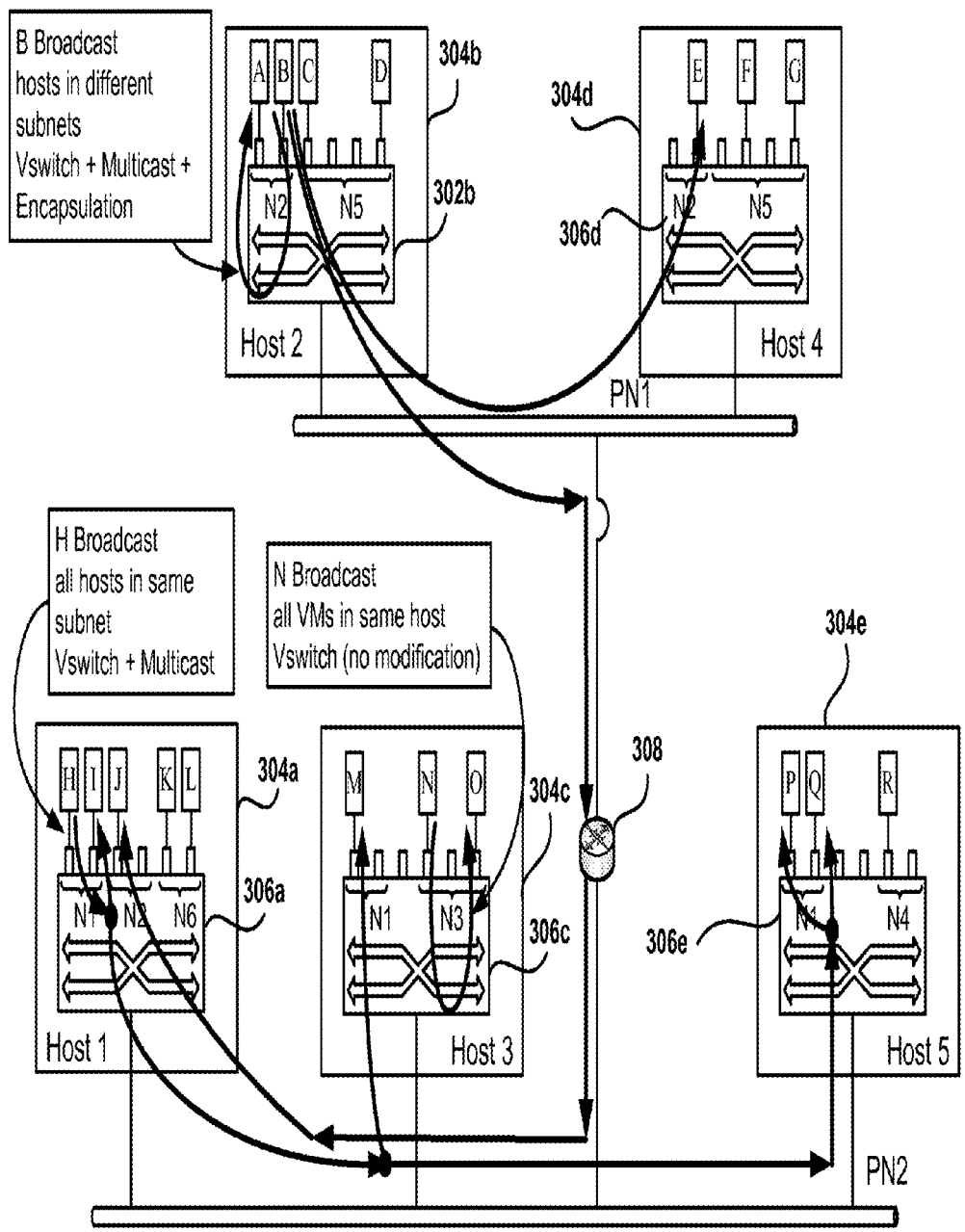
FIG. 6 depicts the transmission of broadcast packets within a PAN, according to one embodiment.

FIG. 6 depicts the transmission of broadcast packets within a PAN, according to one embodiment. Different types of broadcasts are illustrated in FIG. 6. The first type is a broadcast from VM B in PAN N2. The broadcast must reach all the nodes in PAN N2, which are executing in hosts 304a, 304b, and 304d. Since B resides in host 304b, all VMs in host 304b receive the broadcast from VSwitch 306b. The nodes outside host 304b are reached via multicast. To avoid flooding the physical networks, all the broadcasts within a PAN are delivered via multicasts. That is, all the hosts hosting a particular PAN are registered for a common multicast. This way, VSwitch 306d receives the multicast from VM B and delivers B's broadcast to all nodes in PAN N2 (VM E). Another multicast packet is delivered to VSwitch 306a (passing through router 308), which delivers B's broadcast to all nodes in PAN N2 (VM J.) It should also be noted that the implementation may choose to optimize this case by only sending the encapsulated multicast since that will be able to be received by hosts on the local network PN1 as well as the remote network PN2.

A second broadcast is sent from VM N, which is connected to VSwitch 306c in host 304c. Since all the VMs for N3 are connected to VSwitch 306c, the virtual switch delivers the broadcast to all the ports configured for PAN N3.

A third broadcast is sent from node H on PAN N1. The hosts implementing PAN N1 are 304a, 304c, and 304e, which are connected to the same physical network PN2. In similar fashion to B's broadcast, the broadcast from H is converted into a multicast that includes all the nodes in PAN N1. This way, the broadcast is transmitted to VSwitches 306a, 306c, and 306e which deliver the broadcast to N1's nodes (I, M, P, and Q).

Therefore, translating all broadcasts to multicast allows to solve the problems where the broadcast ranges too wide on L2, that is the broadcast reaches all the hosts on the physical network causing performance degradation. Additionally, the broadcasts are cut off at the L3 boundary, so broadcasts do not have to reach hosts without VMs belonging to the PAN for the broadcast. A protocol such as Internet Group Management Protocol (IGMP) is used to register the multicast groups. IGMP is a communications protocol used to manage the membership of IP multicast groups. IGMP is used by IP hosts and adjacent multicast routers to establish multicast group memberships.

FIGS. 7A-7B present two embodiments of network addressing mode tables. The addressing mode tables are used to determine how to distribute packets within a PAN. In one embodiment, each entry in the addressing mode table includes a destination key, a function, and an address to use for the destination. In other embodiments, other fields are included to further define the routing of packets or to offer more than one option for routing packets within the PAN. FIG. 7A illustrates the Addressing Mode Table in host 2 304b (see FIGS. 3-6) for PAN N5. The first entry indicates that the destination is a broadcast, that is, all the nodes in PAN N5. The function associated indicates that delivery of the broadcast is done via a multicast, and the address to use is the IP Multicast address determined for PAN N5.

The next entry corresponds to a unicast address for VM C (Layer 2). Since VM C is in host 2, then the packet can be delivered locally. Thus, the corresponding function is "No modification." The address to be used is C's unicast address without need for translation or encapsulation. The entry or the unicast L2 address of VM D is similar to the entry for VM C because VM D is also local in host 2.

In another embodiment, the same translation table is used in all the hosts. Since the translation function is only executed when the forwarding mechanism determines that the destination is on another host, the fact that the table contains a translation does not actually mean that the internal traffic is translated.

For unicast F address, the function determines an address translation at level 2 because VM F is in a host that shares the same physical network with host 2. As previously described, L2 address translation can be used to send the packet to VM F and the destination address is VM F's external address, referred to as F' in FIG. 7A. This is the general case for unicast addresses in the same physical network.

FIG. 7B illustrates the addressing mode table in host 2 for PAN N2. Some entries are similar to those discussed above in reference to FIG. 7A, but a new type of entry appears in FIG. 7B corresponding to the unicast address for VM J. Host 1 where VM is executing is in a different physical network than host 2, therefore IP encapsulation is used to send the packet across, as previously described in FIG. 5 to send a packet from VM J to VM B. The function for this entry specifies IP encapsulation, and the IP address used in the encapsulation header is the IP address of host 1 in PN2.

In one embodiment, the addressing mode tables, also referred to as translation tables or address lookup tables, are centrally managed by the virtual infrastructure controller which downloads them to the different hosts and updates them as changes occur, such as when a VM is migrated to a different host. In another embodiment, the addressing mode tables are managed by each of the hosts, which cooperate with each other to fill in the corresponding information and to do updates as the VMs change status. In yet another embodiment, the different functions for creating and updating the tables are divided between the hosts and the virtual infrastructure controller. For example, the VIC does the initial creating of the tables, while the hosts update the tables as the VM status change over time. It should be noted that in some embodiments, for the case where all the hosts are on the same physical network and only translation is used, VM migrations never require table updates and the tables on each host are identical.

Reverse lookup tables exist in each of the host that perform the inverse function of the addressing mode tables, that is, once a packet arrives, the reverse lookup tables and the corresponding associated reverse logic are used to determine the PAN and final destination of arriving packets.

Figure 8:
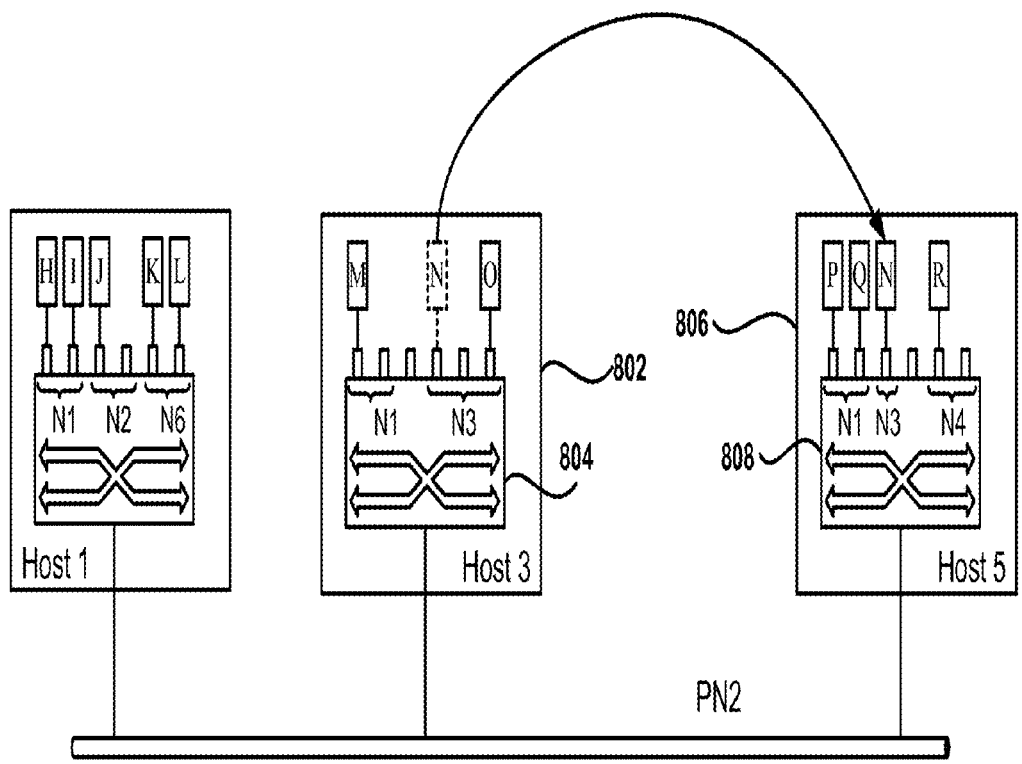
FIG. 8 illustrates the process of migrating a VM to a host which has no support for the PAN used by the migrating VM, according to one embodiment.

FIG. 8 illustrates the process of migrating a VM to a host which has no support for the PAN used by the migrating VM, according to one embodiment. One aspect of virtualization is the ability to live migrate workload transparently from one host computer of a virtualized computer system to another, where live migration is sometimes referred to as VMotion. With VMotion, work loads can be dynamically balanced among host computers. In addition, VMotion enables hardware maintenance to be performed without service interruption by migrating a work load off a host computer that needs to be shut down.

When a VM connected to a PAN is moved to a destination host that has not implemented the PAN, the destination host and the VSwitch in the destination host need to add support for the PAN that the VM is using. This means, among other things, obtaining or creating the addressing mode table in the destination host. If the VM moves to a host outside the physical network connected to the source host, then encapsulation may be needed to reach the VM after the migration, and the functions in the addressing mode tables are adjusted accordingly. Additionally, in the case where the VM moves to a host outside the physical network where the source host resides, the addressing mode tables in other hosts implementing the PAN need to be updated to reflect the new location of the migrating VM. Further yet, if the migrating VM was the last VM for the PAN in the source host, then there is no VM left connected to that PAN in the source host and the multicast group for that PAN on that host can be terminated after the migration.

Referring now to the scenario of FIG. 8, VM N is migrating from host 802 to host 806. VM N is connected to PAN N3 in VSwitch 804. Host 806 does not have support for PAN N3 before VM N's migration. In one embodiment, VSwitch 808 adds functionality for PAN N3 before migrating VM N. This means reserving ports in VSwitch 808 for PAN N3 and creating the addressing mode table for PAN N3. The addressing mode table can be obtained from the Virtual Infrastructure controller or from other host, such as source host 802. The rest of the process for migrating VM N is performed as usual, and VM N is connected to PAN N3 via VSwitch 808. For VM N, the migration is transparent and the layer 2 and layer 3 addresses for VM N have not changed during the migration, because the layer 2 address is still the internal layer 2 address for VM N, and the IP address of VM N has not changed.

In one embodiment, the Virtual Infrastructure Controller has policies for the migration of VMs from one host to another. The policies may be defined to save energy, increase processing bandwidth, improve resource availability, move VMs closer to the user, etc. The policies assess the costs and benefits associated with a potential move and a decision is made whether to migrate a VM or not. One of such policies relates to the goal of having VMs connected to the same PAN execute in as few hosts as possible. This improves communication speed within the PAN as many packets will end in the same host or in a host nearby. Additionally, the processing required is reduced as most packets may not have to be changed or only require address translation. Another benefit is that overall there will be fewer addressing modes tables in the virtual infrastructure as hosts, in general, will have to support a fewer number of PANs.

Figure 9A:
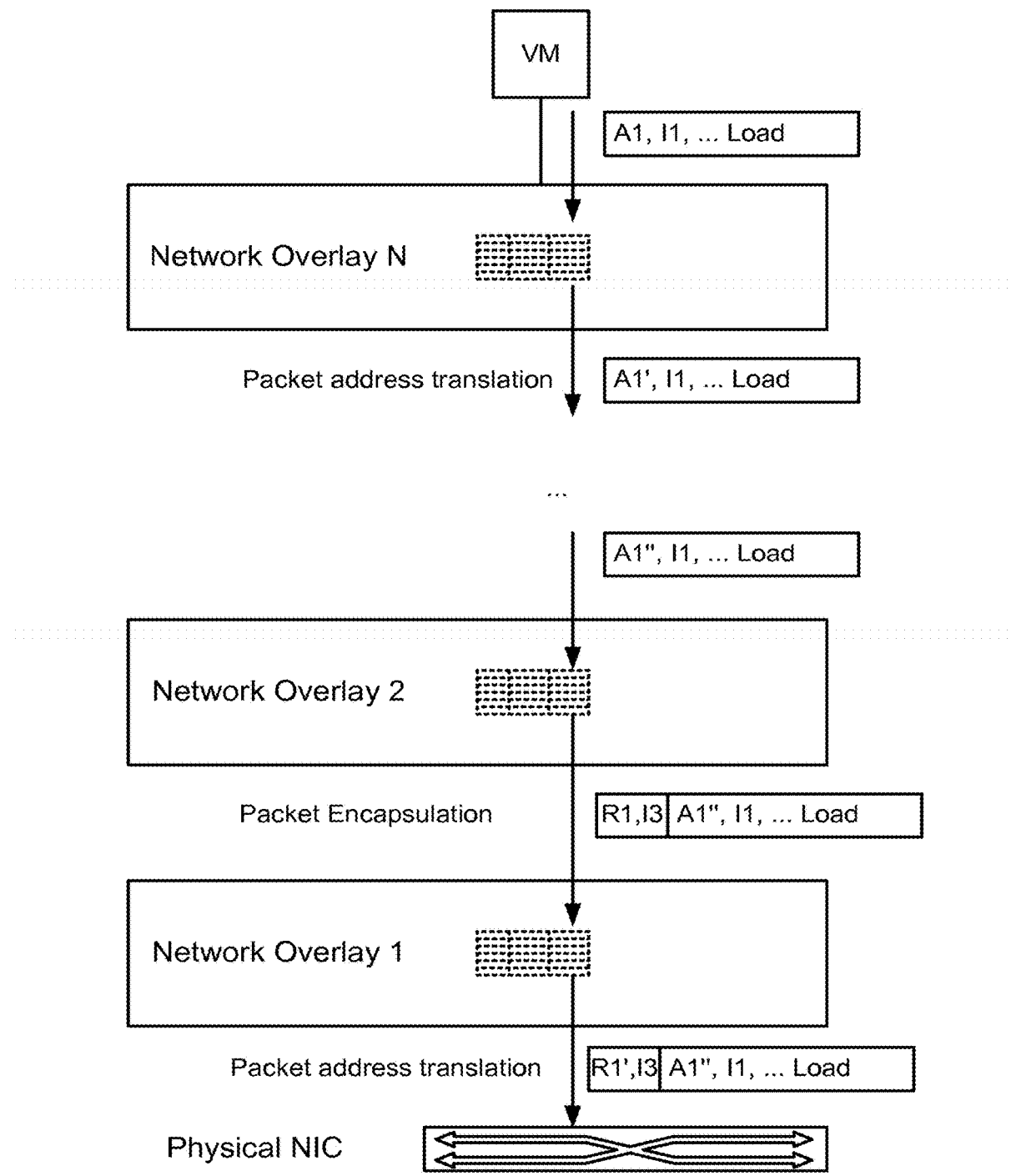
FIGS. 9A-9B illustrate the implementation of PANs in multiple layers, according to one embodiment.
Figure 9B:
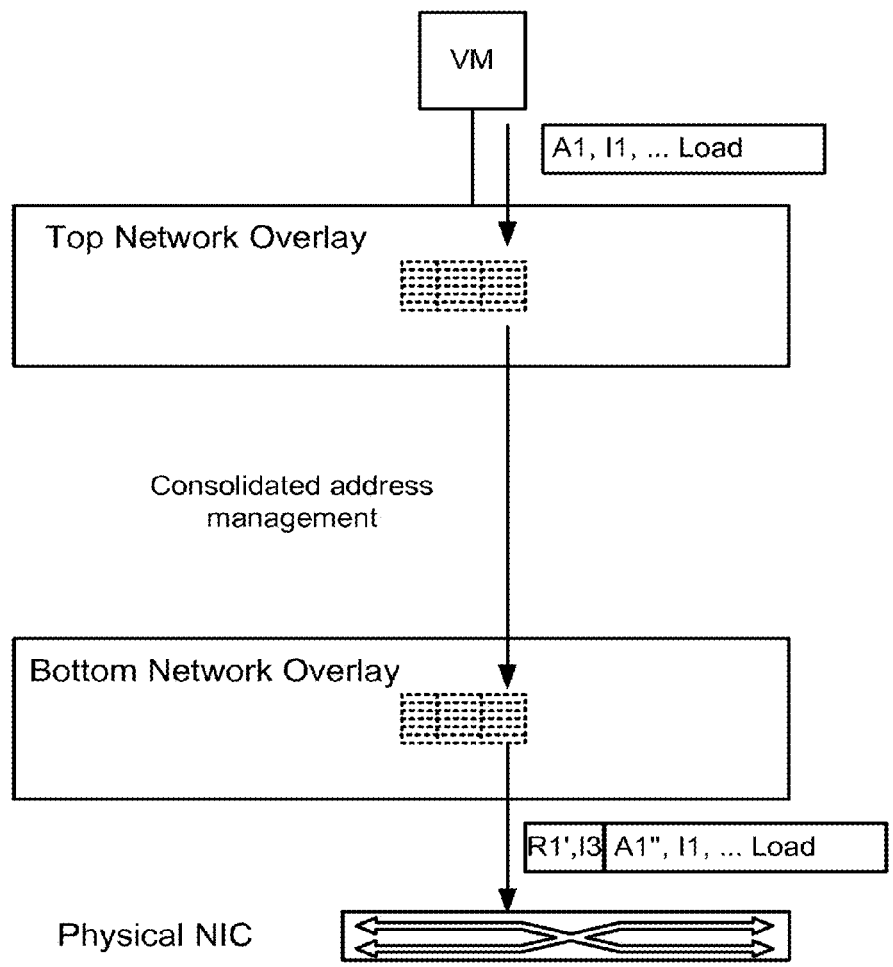

FIGS. 9A-9B illustrate the implementation of PANs in multiple layers, according to one embodiment. The concept of PANs implemented on top of physical networks can be expanded to define PANs implemented on top of other PANs, thereby forming a stack of PAN layers. This means, that a private network can be defined to be implemented on top of another private network. In one embodiment, this is implemented as a VSwitch that connects to another VSwitch instead of connecting to a physical network. In another embodiment, the VSwitch is aware of the different layers and performs all the required functions to send packets out of the host into the physical network. For example, the VSwitch would first use an addressing mode table for the top layer PAN to obtain a first modified packet. Then, the VSwitch would use the second addressing mode table from the second PAN on the modified packet, to obtain a new packet to send down the stack until the final packet is sent on the physical network. This process is described in FIG. 9A, where there are N layers or network overlays. At each level, the packet suffers a potential transformation as previously described, and then the packet is handed to the next layer until the packet reaches the Physical NIC.

In another embodiment, instructions are obtained at each layer and the last layer would do the actual packet modification, including the required translations, encapsulations, etc. In yet another embodiment, as shown in FIG. 9B, the multiple layers are consolidated into two logical layers, the top network overlay interfacing with the VM and the bottom network overlay interfacing with the Physical NIC. The packet modification tasks are done at the top overlay, or the bottom overlay, or the tasks are split between the top and the bottom network overlay. Further, in one more embodiment, a single network overlay layer (not shown) is used that performs all the tasks required for each and every network overlay.

Figure 10:
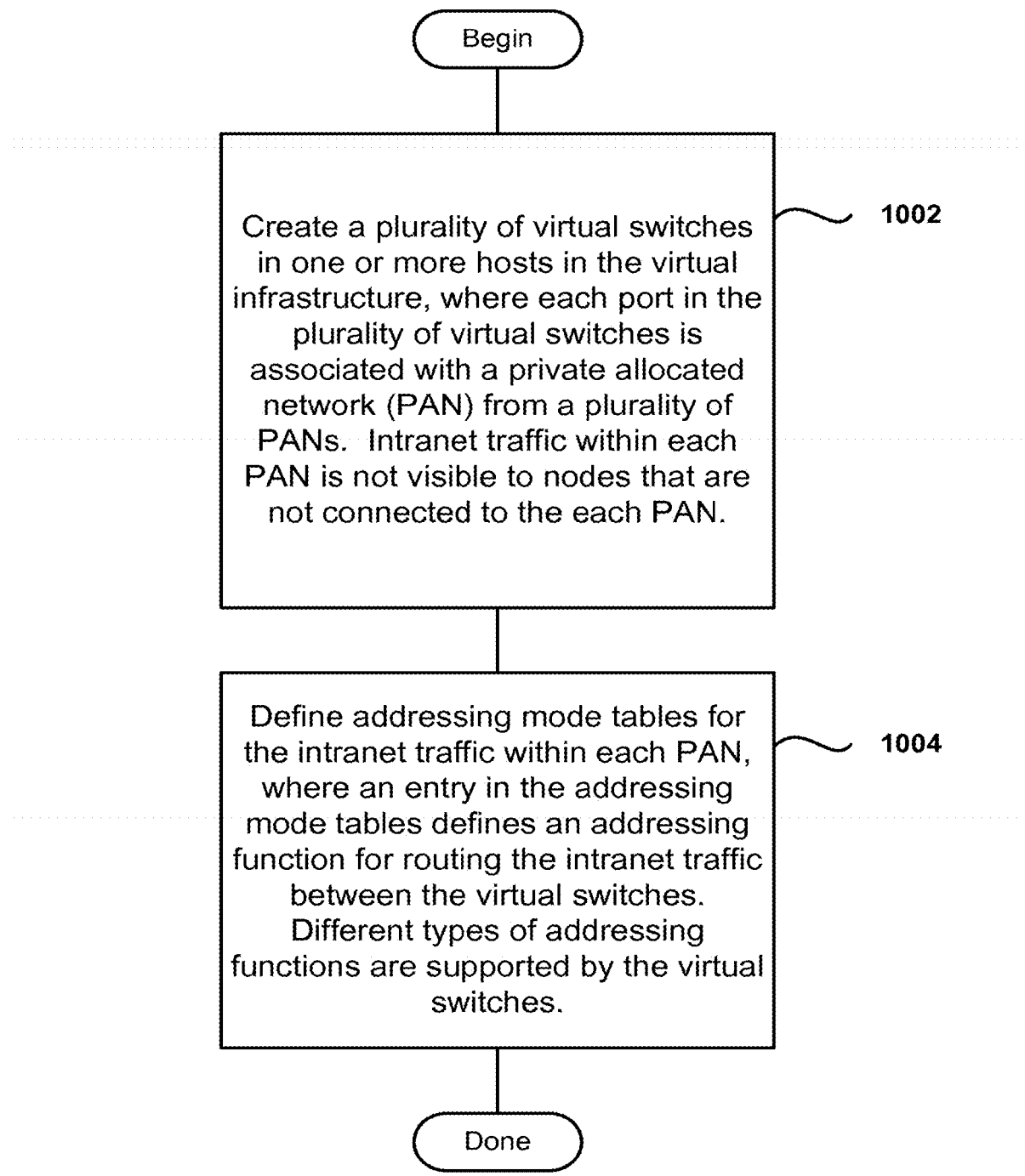
FIG. 10 shows the process flow for implementing private allocated networks in a virtual infrastructure in accordance with one embodiment of the invention.

FIG. 10 shows the process flow for implementing private allocated networks in a virtual infrastructure in accordance with one embodiment of the invention. In operation 1002, a plurality of virtual switches are created in one or more hosts in the virtual infrastructure, where each port in the plurality of virtual switches is associated with a private allocated network (PAN) from a plurality of PANs. See for example, FIGS. 3-6 where virtual switches are created in each of the hosts. Intranet traffic within each PAN is not visible to nodes that are not connected to the each PAN.

Further, in operation 1004 the method defines addressing mode tables for the intranet traffic within each PAN, where an entry in the addressing mode tables defines an addressing function for routing the intranet traffic between the virtual switches. Different types of addressing functions are supported by the virtual switches, as seen for example in the embodiments of FIGS. 7A-7B.

Figure 11:
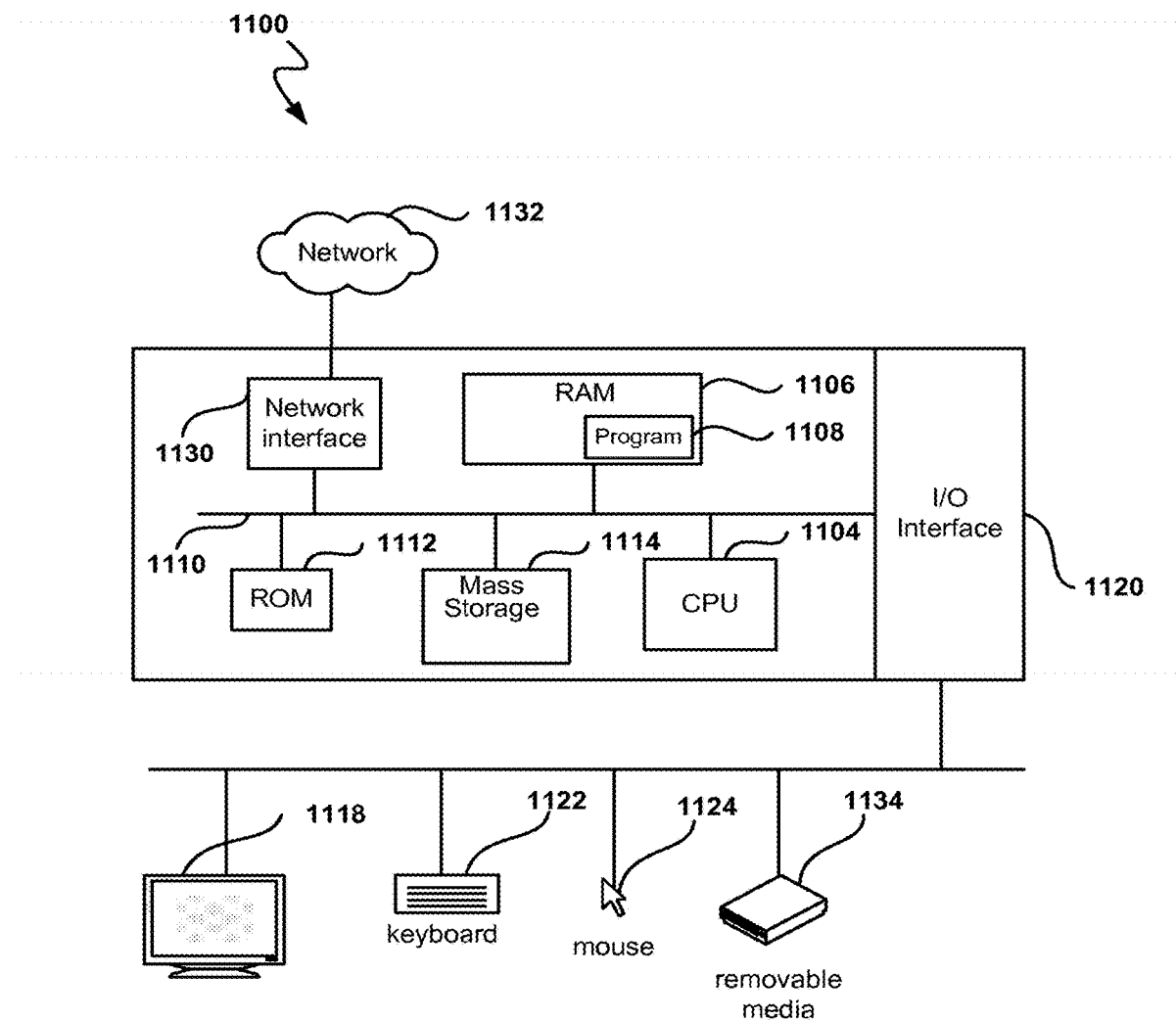
FIG. 11 is a simplified schematic diagram of a computer system for implementing embodiments of the present invention.

FIG. 11 is a simplified schematic diagram of a computer system for implementing embodiments of the present invention. It should be appreciated that embodiments of the invention described herein may be performed with a digital processing system, such as a conventional, general-purpose computer system. Special purpose computers, which are designed or programmed to perform only one function may be used in the alternative. As shown in FIG. 11, the computer system includes a central processing unit 1104, which is coupled through bus 1110 to random access memory (RAM) 1106, read-only memory (ROM) 1112, and mass storage device 1114. Program 1108 resides in RAM 1106, but can also reside in mass storage 1114. Program 1108 can include a virtual machine, a virtual router, and other programs used to implement embodiments of the invention. Mass storage device 1114 represents a persistent data storage device such as a floppy disc drive or a fixed disc drive, which may be local or remote. Network interface 1130 provides connections via network 1132, allowing communications with other devices. It should be appreciated that Central Processing Unit (CPU) 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing a network within which a plurality of private allocated networks (PANs) are implemented, wherein a set of virtual machines on a particular PAN are assigned to a set of host machines in the network, the method comprising:
    generating, for each host machine of the set of host machines, a different addressing mode table that specifies, for a virtual switch on the host machine, rules for forwarding packets within the particular PAN, wherein the addressing mode table for a particular host in the set specifies a first rule for forwarding packets to a first virtual machine assigned to the particular PAN and a second, different rule for forwarding packets to a second virtual machine assigned to the particular PAN; and
    distributing the generated addressing mode tables to the set of host machines in order for the host machines to forward packets between the virtual machines assigned to the particular PAN.

2. The method of claim 1, wherein the first and second rules are specified as entries in the addressing mode table for the particular host, the addressing mode table comprising an entry for each virtual machine in the PAN.

3. The method of claim 2, wherein the entry in the addressing mode table for the particular host for forwarding packets to the first virtual machine is different from the entry in the addressing mode table for a different host for forwarding packets to the first virtual machine.

4. The method of claim 1, wherein the first virtual machine operates in the particular host and the second virtual machine operates in a different host.

5. The method of claim 1, wherein the first virtual machine operates on a second host that is on a same L2 network as the particular host, wherein the second virtual machine operates on a third host that is on a different L2 network than the particular host.

6. The method of claim 1, wherein the particular PAN is a first PAN and the set of virtual machines is a first set, wherein a second set of virtual machines on a second PAN are assigned to a second set of host machines in the network, the method further comprising:
   generating, for each host machine of the second set of host machines, a different addressing mode table that specifies, for a virtual switch on the host machine, rules for forwarding packets within the second PAN; and
   distributing the generated addressing mode tables to the second set of host machines in order for the host machines to forward packets between virtual machines assigned to the second PAN.

7. The method of claim 6, wherein at least one host machine is in both the first set of host machines and the second set of host machines.

8. The method of claim 1 further comprising:
   assigning each virtual machine to a corresponding port of a host machine; and
   assigning the corresponding ports to the particular PAN.

9. The method of claim 1, wherein the first rule specifies to forward packets to the first virtual machine by translating a PAN-specific layer 2 address to a unique layer 2 address.

10. The method of claim 9, wherein the PAN-specific layer 2 address is an address used within the particular PAN as the layer 2 address for the first virtual machine, wherein the PAN-specific layer 2 address is also used within a different PAN as the layer 2 address for a different virtual machine.

11. The method of claim 1, wherein the first rule specifies to forward packets to the first virtual machine by encapsulating the packet with an IP address of a host machine on which the first virtual machine operates.

12. A non-transitory machine readable medium storing a program which when executed by at least one processing unit manages a network within which a plurality of private allocated networks (PANs) are implemented, wherein a set of virtual machines on a particular PAN are assigned to a set of host machines in the network, the program comprising sets of instructions for:
   generating, for each host machine of the set of host machines, a different addressing mode table that specifies, for a virtual switch on the host machine, rules for forwarding packets within the particular PAN, wherein the addressing mode table for a particular host in the set specifies a first rule for forwarding packets to a first virtual machine assigned to the particular PAN and a second, different rule for forwarding packets to a second virtual machine assigned to the particular PAN; and
   distributing the generated addressing mode tables to the set of host machines in order for the host machines to forward packets between the virtual machines assigned to the particular PAN.

13. The non-transitory machine readable medium of claim 12, wherein the first and second rules are specified as entries in the addressing mode table for the particular host, the addressing mode table comprising an entry for each virtual machine in the PAN.

14. The non-transitory machine readable medium of claim 13, wherein the entry in the addressing mode table for the particular host for forwarding packets to the first virtual machine is different from the entry in the addressing mode table for a different host for forwarding packets to the first virtual machine.

15. The non-transitory machine readable medium of claim 12, wherein the first virtual machine operates in the particular host and the second virtual machine operates in a different host.

16. The non-transitory machine readable medium of claim 12, wherein the first virtual machine operates on a second host that is on a same L2 network as the particular host, wherein the second virtual machine operates on a third host that is on a different L2 network than the particular host.

17. The non-transitory machine readable medium of claim 12, wherein the particular PAN is a first PAN and the set of virtual machines is a first set, wherein a second set of virtual machines on a second PAN are assigned to a second set of host machines in the network, the program further comprising sets of instructions for:
   generating, for each host machine of the second set of host machines, a different addressing mode table that specifies, for a virtual switch on the host machine, rules for forwarding packets within the second PAN; and
   distributing the generated addressing mode tables to the second set of host machines in order for the host machines to forward packets between virtual machines assigned to the second PAN.

18. The non-transitory machine readable medium of claim 12, wherein the program further comprises sets of instructions for:
   assigning each virtual machine to a corresponding port of a host machine; and
   assigning the corresponding ports to the particular PAN.

19. The non-transitory machine readable medium of claim 12, wherein the first rule specifies to forward packets to the first virtual machine by translating a PAN-specific layer 2 address to a unique layer 2 address.

20. The non-transitory machine readable medium of claim 19, wherein the PAN-specific layer 2 address is an address used within the particular PAN as the layer 2 address for the first virtual machine, wherein the PAN-specific layer 2 address is also used within a different PAN as the layer 2 address for a different virtual machine.

* * * * *